Patented Aug. 3, 1926.

1,594,707

UNITED STATES PATENT OFFICE.

WILLIAM H. BINDER, OF PASADENA, CALIFORNIA.

PROCESS OF TREATING SALT SOLUTIONS.

No Drawing.    Application filed November 5, 1925.    Serial No. 67,179.

My invention relates to a treatment of salt solutions whereby the various salts are segregated from the mixtures.

In particular, it is an object of this invention to treat a mixture of salts such as found at Searles Lake, California, and other places, containing potassium chloride, borax, sodium sulphate, sodium carbonate and sodium chloride, in a simple, efficient and economic manner, whereby the compounds mentioned may be separated from the mixture.

My invention consists in the steps of the process hereinafter described and claimed.

The liquor of Searles Lake consists of substantially a saturated solution containing the following salts in the proportions stated:

| | Per cent. |
|---|---|
| KCl | 11 |
| $Na_2CO_3$ | 15 |
| $Na_2SO_4$ | 20 |
| Borax | 5 |
| NaCl | 47 | besides other mineral salts present in negligible quantities.

This liquor is approximately 34% salt.

To recover each of the salts just mentioned I proceed as follows:

I take 200 cc. of the saturated solution of the liquor of Searles Lake, and add thereto 25 gr. of potassium chloride and heat the mixture to 90 to 105° C. until the potassium chloride is thoroughly dissolved.

I take now 200 grs. of the mixture of the salts resulting from the evaporation of the original liquor of Searles Lake and add thereto 200 cc. of the above mother liquor and heat the mixture to 90 to 105° C. Substantially all of the dry salt mixture will go into solution, with the exception of the sodium carbonate, sodium sulphate and sodium chloride. The liquid is now separated from the undissolved salts just mentioned and cooled down to 28 to 32° C. whereupon about 26 gr. of potassium chloride crystallizes out. Potassium chloride thus obtained is substantially pure and containing about 1 per cent of borax, and less than 1 per cent of sodium carbonate and only traces of sodium sulphate.

The solution is now further cooled down to 28° C. preferably under agitation, which appears to assist the crystallization, and about 4 gr. of borax together with about 1 per cent potassium chloride crystallizes out. The borax may be purified by fractional crystallization. The remaining mother liquor is now used in a new cycle for the treatment of a dry mixture of salts of Searles Lake liquor just described, to recover potassium chloride and borax.

The undissolved mixture of salts which remains in the treatment of 200 grs. of dry salts of the Searles Lake liquor treated with 200 cc. of the mother liquor above referred to, which mixture of undissolved dry salts consists principally of sodium sulphate, sodium carbonate and sodium chloride, is now treated to separate them from each other in the following manner:

The undissolved salts are dissolved in water, taking approximately 600 gr. water and 200 gr. leached salts, and the mixture is heated to 9.5 to 31° C. and filtered in order to obtain a clear filtrate. About 2% of the mass of leached salts will be removed as insoluble organic matter and other impurities. To the clear filtrate is now added from 10 to 30 grs. of anhydrous sodium sulphate and the mixture is cooled to 3 to 11° C. The anhydrous sodium sulphate will abstract water of crystallization from the solution and will crystallize out together with all of the sodium sulphate originally contained in the solution. After separating the crystallized sodium sulphate from the mixture, the filtrate, which now contains principally sodium carbonate and sodium chloride, is treated with from 15 to 40 grs. of soda ash to 300 cc. of the solution and heated to 9.5 to 30° C. On cooling, the sodium carbonate, which has been added in the form of soda ash, will crystallize out together with the sodium carbonate originally contained in the solution, the soda ash abstracting water of crystallization and causing the separation of the sodium carbonate originally contained with the exception of about 5%. By treatment with carbon dioxide the remaining 5% of sodium carbonate may be converted into sodium bi-carbonate, which, because of its lesser solubility than sodium carbonate, will crystallize from the liquor.

The remaining liquor is a sodium chloride solution containing small quantities of other salts which may now be evaporated down to dryness and used as commercial sodium chloride.

With the treatment above described I am able to economically and efficiently separate various salts contained in the liquor of the Searles Lake into its principal constituents, to-wit, potassium chloride, borax, sodium sulphate, sodium carbonate and sodium chloride.

The operativeness of the process depends upon what may be termed balanced saturated solutions so that the addition of the reagents as described will cause the separation of the particular salt whose segregation is desired.

It will be obvious to those skilled in the art that the sequence of the steps may be varied and that various changes may be made in the steps of the process themselves without departing from the spirit of my invention, as claimed.

I claim:

1. A process of treating liquors containing potassium chloride, sodium carbonate, sodium sulphate, borax and sodium chloride in solution, comprising adding potassium chloride to a saturated solution of the said salts, heating the mixture to dissolve the potassium chloride and adding the liquor to a dry mixture of salts containing potassium chloride, sodium carbonate, sodium sulphate, borax and sodium chloride, heating the mixture whereby all the salts mentioned, with the exception of sodium sulphate and sodium carbonate and sodium chloride are dissolved, separating the liquor from the undissolved salts, cooling the liquor to cause the separation of potassium chloride, separating the potassium chloride, further cooling the liquor whereby the borax contained in the liquor will crystallize out, and separating the borax from the liquor.

2. A process of treating liquors containing potassium chloride, sodium carbonate, sodium sulphate, borax and sodium chloride in solution, as set forth in claim 1, in which the last step of cooling to crystallize out the borax is carried out under the agitation of the liquor.

3. A process of treating a mixture of salts containing sodium carbonate, sodium sulphate and sodium chloride, comprising dissolving the same in water to form a saturated solution and adding anhydrous sodium sulphate in quantity sufficient to cause the crystallization of the sodium sulphate originally in the solution by the abstraction of water of crystallization of the anhydrous sodium sulphate added thereto and separating the crystallized sodium sulphate from the mixture.

4. A process of treating a mixture of salts containing sodium carbonate, sodium sulphate, sodium chloride, as set forth in claim 3, adding soda ash to the liquor in quantity sufficient to cause the crystallization of the sodium carbonate originally contained in the mixture of salts by the abstraction of water of crystallization by the soda ash added thereto, heating the mixture until the soda ash is dissolved, cooling the mixture to crystallize all the sodium carbonate originally contained therein together with the soda ash converted into sodium carbonate associated with water of crystallization, and separating the crystallized sodium carbonate from the mixture.

5. A process of treating a mixture of salts containing sodium carbonate, sodium sulphate and sodium chloride, as set forth in claim 4, treating the remaining liquor with carbon dioxide to form sodium bi-carbonate of the remaining sodium carbonate in the liquor, separating sodium bi-carbonate from the liquor and evaporating the liquor to dryness, whereby commercial sodium chloride is produced.

In testimony whereof I have signed my name to this specification.

WILLIAM H. BINDER.